US009880869B2

(12) United States Patent
Mraz et al.

(10) Patent No.: US 9,880,869 B2
(45) Date of Patent: Jan. 30, 2018

(54) SINGLE COMPUTER-BASED VIRTUAL CROSS-DOMAIN SOLUTIONS

(71) Applicant: Owl Computing Technologies, Inc., Ridgefield, CT (US)

(72) Inventors: Ronald Mraz, South Salem, NY (US); Steven Staubly, Newton, CT (US); Michael M. Tsao, Yorktown Heights, NY (US)

(73) Assignee: Owl Cyber Defense Solutions, LLC, Ridgefield, CT (US)

( * ) Notice: Subject to any disclaimer, the term of this patent is extended or adjusted under 35 U.S.C. 154(b) by 312 days.

(21) Appl. No.: 14/712,476

(22) Filed: May 14, 2015

(65) Prior Publication Data

US 2016/0205215 A1    Jul. 14, 2016

Related U.S. Application Data (60) Provisional application No. 62/102,915, filed on Jan. 13, 2015.

(51) Int. Cl.
| G06F 15/16 | (2006.01) |
| G06F 9/455 | (2006.01) |
| H04L 12/715 | (2013.01) |
| G06F 9/50 | (2006.01) |

(52) U.S. Cl.
CPC ........ *G06F 9/45558* (2013.01); *G06F 9/5077* (2013.01); *H04L 45/04* (2013.01); *G06F 2009/45595* (2013.01)

(58) Field of Classification Search
CPC ..... H04L 67/28; H04L 67/32; H04L 67/1097; H04L 45/04; G06F 15/167; G06F 9/45558; G06F 2009/45595

USPC .......................... 707/827; 709/203, 217, 219
See application file for complete search history.

(56) References Cited

U.S. PATENT DOCUMENTS

| 5,703,562 | A | 12/1997 | Nilsen |
| 7,675,867 | B1 | 3/2010 | Mraz et al. |
| 7,941,526 | B1 | 5/2011 | Hope et al. |
| 7,992,209 | B1 | 8/2011 | Menoher et al. |
| 8,068,415 | B2 | 11/2011 | Mraz |
| 8,139,581 | B1 | 3/2012 | Mraz et al. |
| 8,266,689 | B2 | 9/2012 | Menoher et al. |
| 8,352,450 | B1 | 1/2013 | Mraz et al. |

(Continued)

*Primary Examiner* — Frantz Jean
(74) *Attorney, Agent, or Firm* — Economou Silfin LLP; John S. Economou (57) ABSTRACT

Three embodiments of one-way cross-domain systems for transferring information from a client in a first security domain to a server in a second separate security domain are disclosed. In addition, three embodiments of bilateral cross-domain systems for transferring first information from a client in a first security domain to a server in a second separate security domain and second information from the server in the second separate security domain to the client in the first security domain are also disclosed. Each of the one-way and bilateral cross-domain systems is based upon a single computer server which employs a number of virtual machines to implement send and receive servers. The single computer server also implements one (for the one-way cross-domain systems) or two (for the bilateral cross-domain systems) virtual one-way data links in either virtual machines or within the hypervisor portion of the operating system.

19 Claims, 6 Drawing Sheets

(56) References Cited

U.S. PATENT DOCUMENTS

| | | | |
|---|---|---|---|
| 8,353,022 B1 | 1/2013 | Menoher et al. | |
| 8,498,206 B2 | 7/2013 | Mraz | |
| 8,516,580 B2 | 8/2013 | Menoher | |
| 8,565,237 B2 | 10/2013 | Mraz et al. | |
| 8,584,211 B1 * | 11/2013 | Vetter | H04L 63/105 707/786 |
| 8,646,094 B2 | 2/2014 | Staubly | |
| 8,732,453 B2 | 5/2014 | Mraz et al. | |
| 8,776,254 B1 | 7/2014 | Mraz et al. | |
| 8,831,222 B2 | 9/2014 | Menoher et al. | |
| 8,887,276 B2 | 11/2014 | Mraz et al. | |
| 8,898,227 B1 | 11/2014 | Mraz et al. | |
| 8,938,795 B2 | 1/2015 | Clarke et al. | |
| 8,997,202 B2 | 3/2015 | Curry et al. | |
| 9,021,559 B1 * | 4/2015 | Vetter | H04L 63/105 707/786 |
| 2012/0030768 A1 | 2/2012 | Mraz et al. | |
| 2012/0162697 A1 | 6/2012 | Mraz et al. | |
| 2013/0254878 A1 | 9/2013 | Mraz et al. | |
| 2014/0020109 A1 | 1/2014 | Mraz et al. | |
| 2014/0089388 A1 | 3/2014 | Curry et al. | |
| 2014/0136657 A1 | 5/2014 | Mraz | |
| 2014/0139732 A1 | 5/2014 | Mraz et al. | |
| 2014/0139737 A1 | 5/2014 | Clarke et al. | |
| 2014/0165182 A1 | 6/2014 | Curry et al. | |
| 2014/0207939 A1 | 7/2014 | Mraz et al. | |
| 2014/0208420 A1 | 7/2014 | Mraz et al. | |
| 2014/0208433 A1 | 7/2014 | Mraz et al. | |
| 2014/0237372 A1 | 8/2014 | Mraz et al. | |
| 2014/0237561 A1 | 8/2014 | Mraz | |
| 2014/0304371 A1 | 10/2014 | Mraz et al. | |
| 2014/0337407 A1 | 11/2014 | Mraz et al. | |
| 2014/0337410 A1 | 11/2014 | Mraz et al. | |
| 2015/0020155 A1 | 1/2015 | Curry et al. | |
| 2015/0020194 A1 | 1/2015 | Mraz et al. | |
| 2015/0026792 A1 | 1/2015 | Mraz et al. | |
| 2015/0058385 A1 | 2/2015 | Mraz et al. | |
| 2015/0058925 A1 * | 2/2015 | Curry | H04L 63/20 726/3 |
| 2015/0067104 A1 | 3/2015 | Curry et al. | |

* cited by examiner

SINGLE COMPUTER-BASED VIRTUAL CROSS-DOMAIN SOLUTIONS

FIELD

This disclosure relates generally to cross-domain solutions implemented using virtual servers in a single server computer.

BACKGROUND

A cross-domain solution (CDS) is a system that provides the ability to access or transfer data between two networks having differing security domains. A CDS may be one-way only (from a low to a high domain or from a high to a low domain) or may be two-way. For a one-way CDS, highly engineered solutions, such as the Owl Computing Technologies® Dual Diode, provide a direct point-to-point optical link between the two networks having differing security domains (with data transfer in either the low-to-high direction or in the low-to-high direction).

A hardware-based one-way CDS typically requires two server computers, one coupled to one of the networks and another coupled to the other of the networks. Such a system is shown in FIG. 2 of U.S. Pat. No. 8,139,581 B1 which issued on Mar. 20, 2012 to Mraz et al. ("the '581 patent"). The '581 patent is incorporated by reference in its entirety herein. As described in the '581 patent, IP information is stripped from the packets to be transmitted in the send node prior to transmission of such packets across the one-way data link to the receive node which then forwards the received packets to a destination according to a stored channel number table and based upon a channel number added to such packets at the send node. This provides a complete IP protocol break between the two networks, ensuring that there is no possibility of security breach through software attack.

A hardware-based two-way CDS typically requires four server computers, as shown for example in FIG. 3 of U.S. Pat. No. 8,898,227 B1 which issued on Nov. 25, 2014 to Mraz et al. ("the '227 patent"). The '227 patent is also incorporated by reference in its entirety herein. Two of the server computers are used for communications in one direction, and the other two server computers are used for communications in a second direction opposite to the first direction. The system shown in FIG. 3 of the '227 patent implements a Network File System (NFS) across a security boundary, allowing a user at a client on a first network to access information on a server computer on a second network, even when the first network is at a different security level than the second network.

A drawback to such systems is the need for multiple server computers and for specialized transmit/receive card sets for implementing the one-way data link, adding cost, reliability issues and overhead expense (e.g., additional maintenance requirements) to the implementation of one-way and two-way CDS systems.

Accordingly, there is a need for secure one-way and two-way CDS systems which can run on a single server computer.

SUMMARY

In a first aspect, a one-way cross-domain system for transferring information from a client in a first security domain to a server in a second separate security domain is provided. The system includes a server computer configured to run a first virtual machine and a second virtual machine. The first virtual machine is completely separate from the second virtual machine. The system also includes a first network interface card installed in the server computer for coupling to the client in the first security domain and a second network interface card installed in the server computer for coupling to the server in the second separate security domain. The system further includes a one-way transmit card having an external output and installed in the server computer, a one-way receive card having an external input and installed in the server computer, and an external communications link having a first end coupled only to the external output of the one-way transmit card and a second end coupled only to the external input of the one-way receive card. The one-way transmit card is configured to only communicate with the one-way receive card via the external communications link. The first virtual machine is configured to only communicate with the first network interface card and the one-way transmit card. In addition, the first virtual machine is configured to receive information from the client via the first network interface card and to forward the received information to the one-way transmit card. The second virtual machine is configured to only communicate with the one-way receive card and the second network interface card. In addition, the second virtual machine is configured to receive the information forwarded from the first virtual machine via the one-way transmit card, the external communication link, and the one-way receive card and to forward the received information to the server in the second separate security domain via the second network interface card. The client is only communicatively coupled to the server via the first network interface card, the first virtual machine, the transmit card, the external communications link, the receive card, the second virtual machine and the second network interface card.

In a further embodiment, the server computer may include a memory separable into at least a first portion and a second portion, the first portion of the memory separate from the second portion of the memory. In this further embodiment, the first network interface card, the first virtual machine and the one-way transfer card are each configured to access only the first portion of the memory, and the one-way receive card, the second virtual machine and the second network interface card are each configured to access only the second portion of the memory. Still further, the external communications link may be an optical fiber.

In a second aspect, a one-way cross-domain system for transferring information from a client in a first security domain to a server in a second separate security domain is provided. The system includes a server computer configured to run a first virtual machine, a second virtual machine, and a third virtual machine. Each of the virtual machines is completely separate from each other virtual machine. The system also includes a first network interface card installed in the server computer for coupling to the client in the first security domain and a second network interface card installed in the server computer for coupling to the server in the second separate security domain. The first virtual machine is configured to only communicate with the first network interface card and the second virtual machine. The first virtual machine is also configured to receive information from the client via the first network interface card and to forward the received information to the second virtual machine. The second virtual machine is configured to only communicate with the first virtual machine and the third virtual machine. The second virtual machine is also configured to receive information from the first virtual machine and to forward the received information to the third virtual machine. The second virtual machine is further configured to be unable to receive any information from the third virtual machine and to be unable to send any information to the first virtual machine. The third virtual machine is configured to only communicate with the second virtual machine and the second network interface card. The third virtual machine is also configured to receive the information forwarded from the first virtual machine via the second virtual machine and to forward the received information to the server in the second separate security domain via the second network interface card. The client is only communicatively coupled to the server via the first network interface card, the first virtual machine, the second virtual machine, the third virtual machine and the second network interface card. The third virtual machine may be within a third separate security domain.

In a further embodiment, the server computer may include a memory separable into at least a first portion, a second portion and a third portion. Each portion of the memory is separate from each other portion of the memory. The first network interface card and the first virtual machine are each configured to access only the first portion of the memory. The second virtual machine is configured to access only the second portion of the memory. The third virtual machine and the second network interface card are each configured to access only the third portion of the memory.

In a third aspect, a one-way cross-domain system for transferring information from a client in a first security domain to a server in a second separate security domain is provided. The system includes a server computer configured to run a first virtual machine and a second virtual machine. The first virtual machine is completely separate from the second virtual machine. The first virtual machine and the second virtual machine are controlled by a hypervisor. The server computer is also configured to provide a hypervisor-based one-way link having an input and an output. The hypervisor-based one-way link is configured to transfer information received at the input to the output and to be incapable of transferring any information from the output to the input. The system also includes a first network interface card installed in the server computer for coupling to the client in the first security domain and a second network interface card installed in the server computer for coupling to the server in the second separate security domain. The first virtual machine is configured to only communicate with the first network interface card and the input of the hypervisor-based one-way link. The first virtual machine is also configured to receive information from the client via the first network interface card and to forward the received information to the input of the hypervisor-based one-way link. The second virtual machine is configured to only communicate with the output of the hypervisor-based one-way link and the second network interface card. The second virtual machine is also configured to receive the information forwarded from the first virtual machine via the hypervisor-based one-way link and to forward the received information to the server in the second separate security domain via the second network interface card. The hypervisor-based one-way link may be within a third separate security domain.

In a further embodiment, the server computer may include a memory separable into at least a first portion, a second portion and a third portion, each portion of the memory separate from each other portion of the memory, wherein first network interface card and the first virtual machine are each configured to access only the first portion of the memory, wherein the hypervisor-based one-way link is configured to access only the second portion of the memory, and wherein the second virtual machine and the second network interface card are each configured to access only the third portion of the memory.

In a fourth aspect, a bilateral cross-domain system for transferring first information from a client in a first security domain to a server in a second separate security domain and second information from the server in the second separate security domain to the client in the first security domain is provided. The system includes a server computer configured to run a first virtual machine, a second virtual machine, a third virtual machine and a fourth virtual machine. Each of the virtual machines is completely separate from each of the other virtual machines. The system also includes a first network interface card installed in the server computer for coupling to the client in the first security domain and a second network interface card installed in the server computer for coupling to the server in the second separate security domain. The system further includes a first one-way transmit card having an external output installed in the server computer, a first one-way receive card having an external input installed in the server computer, and a first external communications link having a first end coupled only to the external output of the first one-way transmit card and a second end coupled only to the external input of the first one-way receive card. The system still further includes a second one-way transmit card having an external output installed in the server computer, a second one-way receive card having an external input installed in the server computer, and a second external communications link having a first end coupled only to the external output of the second one-way transmit card and a second end coupled only to the external input of the second one-way receive card. The first one-way transmit card is configured to only communicate with the first one-way receive card via the first external communications link. The second one-way transmit card is configured to only communicate with the second one-way receive card via the second external communications link. The first virtual machine is configured to only communicate with the first network interface card, the second one-way receive card and the second virtual machine. The first virtual machine is also configured to receive the first information from the client via the first network interface card and to forward the received first information to the second virtual machine. The first virtual machine is further configured to receive the second information from the second one-way receive card via the second external communications link and the second one-way transmit card and to forward the received second information to the client via the first network interface card. The second virtual machine is configured to only communicate with the first virtual machine and the first one-way transmit card. The second virtual machine is also configured to receive the first information forwarded from the first virtual machine and to forward the received first information to the first one-way transmit card. The third virtual machine is configured to only communicate with the first one-way receive card and the fourth virtual machine. The third virtual machine is also configured to receive the first information from the first one-way receive card via the first external communications link and the first one-way transmit card and to forward the received first information to the fourth virtual machine. The fourth virtual machine is configured to only communicate with the third virtual machine, the second one-way transmit card and the second network interface card. The fourth virtual machine is also configured to receive the first information forwarded from the third virtual machine and to forward the received first information to the server in the second separate security domain via the second network interface card. The fourth virtual machine is further configured to receive the second information from the server in the second separate security domain via the second network interface card and to forward the received second information to the second one-way transmit card.

In a further embodiment, the server computer may include a memory separable into at least four separate portions. Each portion of the memory is separate from each other portion of the memory. The first network interface card, the first virtual machine and the second one-way receive card are each configured to access only a first portion of the memory. The second virtual machine and the first one-way transfer card are each configured to access only a second portion of the memory. The first one-way receive card and the third virtual machine are each configured to access only a third portion of the memory. The second one-way transfer card, the fourth virtual machine and the second network interface card are each configured to access only a fourth portion of the memory. Still further, the first and second external communications links may each be a separate optical fiber.

In a fifth aspect, a bilateral cross-domain system for transferring first information from a client in a first security domain to a server in a second separate security domain and second information from the server in the second separate security domain to the client in the first security domain is provided. The system includes a server computer configured to run a first virtual machine, a second virtual machine, a third virtual machine, a fourth virtual machine, a fifth virtual machine and a sixth virtual machine. Each of the virtual machines is completely separate from each of the other virtual machines. The system also includes a first network interface card installed in the server computer for coupling to the client in the first security domain and a second network interface card installed in the server computer for coupling to the server in the second separate security domain. The first virtual machine is configured to only communicate with the first network interface card, the second virtual machine and the fourth virtual machine. The first virtual machine is also configured to receive the first information from the client via the first network interface card and to forward the received first information to the fourth virtual machine. The first virtual machine is further configured to receive the second information from the second virtual machine and to forward the received second information to the client in the first security domain via the first network interface card. The second virtual machine is configured to only communicate with the first virtual machine and the third virtual machine. The second virtual machine is also configured to receive the second information from the third virtual machine and to forward the received second information to the first virtual machine. The second virtual machine is further configured to be unable to receive any information from the first virtual machine and to be unable to send any information to the third virtual machine. The third virtual machine is configured to only communicate with the second virtual machine, the second network interface card and the sixth virtual machine. The third virtual machine is also configured to receive the first information forwarded from the first virtual machine via the fourth virtual machine, the fifth virtual machine and the sixth virtual machine and to forward the received first information to the server in the second separate security domain via the second network interface card. The third virtual machine is further configured to receive the second information from the server in the second separate security domain via the second network interface card and to forward the received second information to the second virtual machine. The fourth virtual machine is configured to only communicate with the first virtual machine and the fifth virtual machine. The fourth virtual machine is also configured to receive the first information forwarded from the first virtual machine and to forward the received first information to the fifth virtual machine. The fifth virtual machine is configured to only communicate with the fourth virtual machine and the sixth virtual machine. The fifth virtual machine is also configured to receive the first information from the first virtual machine and to forward the received first information to the sixth virtual machine. The fifth virtual machine is further configured to be unable to receive any information from the sixth virtual machine and to be unable to send any information to the fourth virtual machine. The sixth virtual machine is configured to only communicate with the fifth virtual machine and the third virtual machine. The sixth virtual machine is also configured to receive the first information from the fifth virtual machine and to forward the received first information to the third virtual machine. The second virtual machine and the fifth virtual machine may be within a third separate security domain. Further, the third separate security domain may be separated into two separate portions, with the second virtual machine within one of the two separate portions and the fifth virtual machine within the other of the two separate portions.

In a further embodiment, the server computer may include a memory separable into at least six portions. Each portion of the memory is separate from each other portion of the memory. The first network interface card and the first virtual machine are each configured to access only a first portion of the memory. The second virtual machine is configured to access only a second portion of the memory. The third virtual machine and the second network interface card are each configured to access only the third portion of the memory. The fourth virtual machine is configured to access only a fourth portion of the memory. The fifth virtual machine is configured to access only a fifth portion of the memory. The sixth virtual machine is configured to access only a sixth portion of the memory.

In a sixth aspect, a bilateral cross-domain system for transferring first information from a client in a first security domain to a server in a second separate security domain and second information from the server in the second separate security domain to the client in the first security domain is provided. The system includes a server computer configured to run four virtual machines. Each of the virtual machines is completely separate from each other virtual machine. Each of the virtual machines is controlled by a hypervisor. The server computer is also configured to provide a first hypervisor-based one-way link having an input and an output and a second hypervisor-based one-way link having an input and an output. Each of the hypervisor-based one-way links is configured to transfer information received at the input to the output and to be incapable of transferring any information from the output to the input. The system also includes a first network interface card installed in the server computer for coupling to the client in the first security domain and a second network interface card installed in the server computer for coupling to the server in the second separate security domain. The first virtual machine is configured to only communicate with the first network interface card, the third virtual machine and the output of the first hypervisor-based one-way link. The first virtual machine is also configured to receive the first information from the client via the first network interface card and to forward the received first information to the third virtual machine. The first virtual machine is further configured to receive the second information from the output of the first hypervisor-based one-way link and to forward the received second information to the client via the first network interface card. The second virtual machine is configured to only communicate with the input of the first hypervisor-based one-way link, the fourth virtual machine and the second network interface card. The second virtual machine is also configured to receive the first information forwarded from the first virtual machine via the fourth virtual machine, the second hypervisor-based one-way link and the third virtual machine and to forward the received first information to the server in the second separate security domain via the second network interface card. The second virtual machine is further configured to receive the second information from the server via the second one-way network interface card and to forward the received second information to the input of the first hypervisor-based one-way link. The third virtual machine is configured to only communicate with the first virtual machine and the input of the second hypervisor-based one-way link. The third virtual machine is also configured to receive the first information from the first virtual machine and to forward the received first information to the input of the second hypervisor-based one-way link. The fourth virtual machine is configured to only communicate with the output of the second hypervisor-based one-way link and the second virtual machine. The fourth virtual machine is also configured to receive the first information from the output of the second hypervisor-based one-way link and to forward the received first information to the second virtual machine. Each of the first and the second hypervisor-based one-way links may be within a third separate security domain.

In a further embodiment, the server computer may include a memory separable into at least six portions. Each portion of the memory is separate from each other portion of the memory. The first network interface card and the first virtual machine are each configured to access only a first portion of the memory. The first hypervisor-based one-way link is configured to access only a second portion of the memory. The second virtual machine and the second network interface card are each configured to access only a third portion of the memory. The third network interface card is configured to access only a fourth portion of the memory. The second hypervisor-based one-way link is configured to access only a fifth portion of the memory. The fourth virtual machine is configured to access only a sixth portion of the memory.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
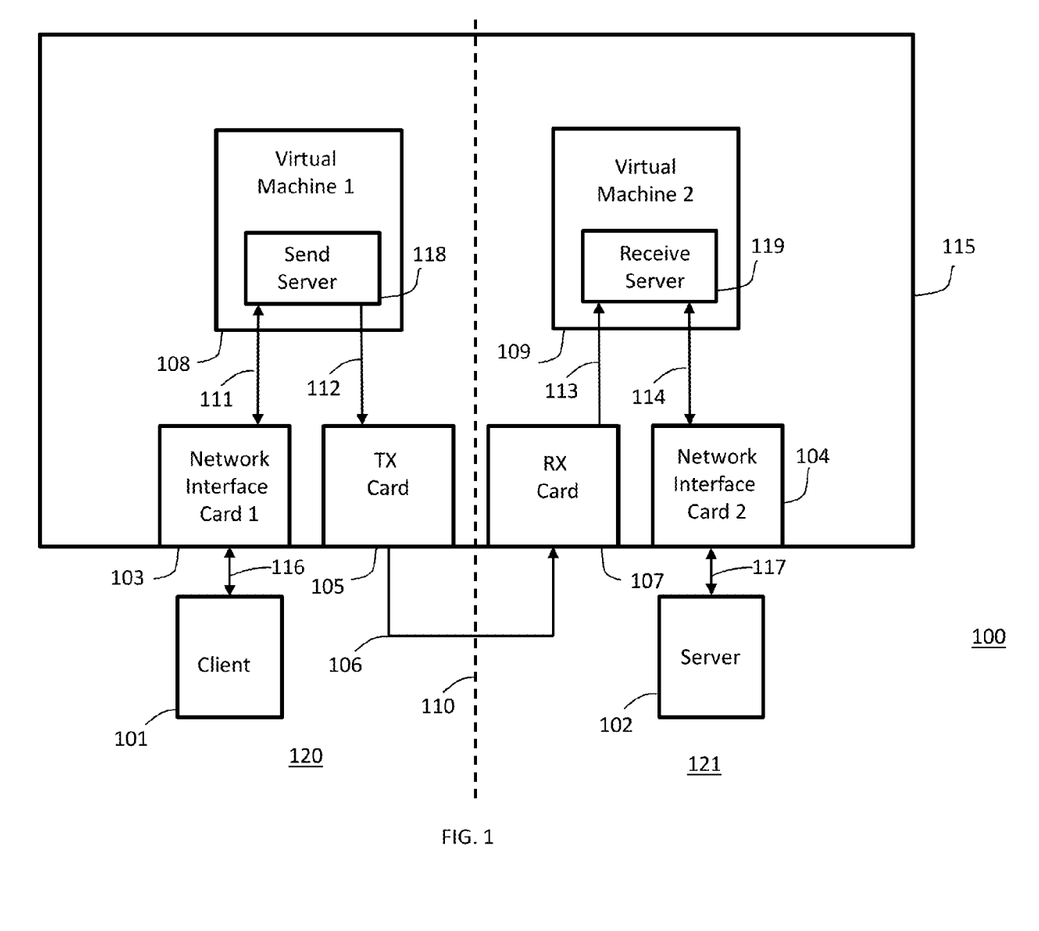
FIG. 1 is a block diagram of a one-way CDS system incorporating aspects of a first embodiment of the present disclosure.

Referring now to the drawings, and in particular to FIG. 1, a first embodiment of a one-way CDS system 100 is shown which is based upon a single server computer 115 and which allows a client computer 101 to transfer information across a domain boundary line 110 to a server computer 102 and prevents any information (or signals of any kind) from passing from the server computer 102 to the client computer 101. Client computer 101 may be located within a first security domain 120 (the area to the left of security domain boundary line 110) and server computer 102 may be within a second security domain 121 (the area to the right of security domain boundary line 110). As one of ordinary skill in the art will readily recognize, in certain implementations the first security domain may be higher than the second security domain and in other implementations the first security domain may be lower than the second security domain.

In particular, server computer 115 of one-way CDS system 100 is coupled to client computer 101 via a first computer network 116 and a first network interface card 103. Server 115 is also coupled to server computer 102 via a second computer network 117 and a second network interface card 104. The network interface cards 103, 104 are conventional and typically comprises a circuit board populated with the necessary network interface circuitry thereon that can be easily coupled to or installed in a computer so that it can be connected to a network or to another computer. When two or more computers (or other networked devices) are connected via network interface cards (NICs) and an intervening network, the NICs and intervening network typically provide a transparent interface between such computers. In particular, a computer presents data to the installed NIC so that it may be passed to another networked device and the NIC formats that data for transport over the intervening network. Conversely, the NIC receives data from an external device or computer vial the intervening network computer and reformats such data so that the computer can understand it. Network interface cards provide a dedicated, full-time connection between computers or devices coupled to a network. As one of ordinary skill in the art will readily recognize, a conventional NIC is designed for a particular type of network, protocol, and media.

Server computer 115 in FIG. 1 also includes a transmit (TX) card 105 and a receive (RX) card 107, with the TX card 105 coupled to the RX card 107 via an external link 106. In the preferred embodiment, TX card 105 and RX card 107 may be matched Owl DualDiode® communication cards provided by Owl Computing Technologies, Inc., with the TX card 105 coupled to the RX card 107 by an optical fiber 106.

Server computer 115 is configured to run an operating system that allows multiple completely separate virtual machines to run. Preferably, Linux (or a variant thereo) is used as the operating system and virtualization software such as Kernel-based Virtual Machine (KVM) is run under Linux to provide for a number of virtual machines. As one of ordinary skill in the art will readily recognize, other options are available for both the base operating system and for the virtualization software. In the one-way CDS system 100 shown in FIG. 1, two separate virtual machines 108, 109 are provided. Virtual machine 108 implements a send server 118 and is only coupled to the first network interface card 103 and to TX card 105. Virtual machine 109 implements a receive server 119 and is only coupled to the RX card 107 and to the second network interface card 104. In one embodiment, send server 118 and receive server 119 operate in the same manner as send node 204 and receive node 208 in FIG. 2 of the '581 patent for transmission of TCP packets across the one-way data link formed by TX card 105, optical fiber 106 and RX card 107. In another embodiment, send server 118 and receive server 119 may operate in substantially the same manner as send node 404 and receive node 408 in FIG. 4 of the '581 patent for transmission of UDP packets from a single source across the one-way data link formed by TX card 105, optical fiber 106 and RX card 107. In yet another embodiment, send server 118 and receive server 119 may operate in substantially the same manner as send node 507 and receive node 515 in FIG. 5 of the '581 patent for transmission of UDP packets from multiple sources across the one-way data link formed by TX card 105, optical fiber 106 and RX card 107. Finally, in a still further embodiment, send server 118 and receive server 119 may operate in substantially the same manner as send node 613 and receive node 630 in FIG. 6 of the '581 patent for transmission of packets in two or more transport layer protocols from multiple sources across the one-way data link formed by TX card 105, optical fiber 106 and RX card 107.

To ensure the separation of virtual machine 108 from virtual machine 109, separate memory locations are provided for use by first network interface card 103, virtual machine 108 and TX card 105 on the first hand and RX card 107, virtual machine 109 and second network interface card 104 on the second hand. This helps maintain a virtual separation between the first security domain 120 and the second security domain 121. The use of virtualization software reduces the cost of and complexity of one-way CDS system 100 over conventional systems (e.g., by eliminating an entire server computer from the system disclosed in the '581 patent).

Figure 2:
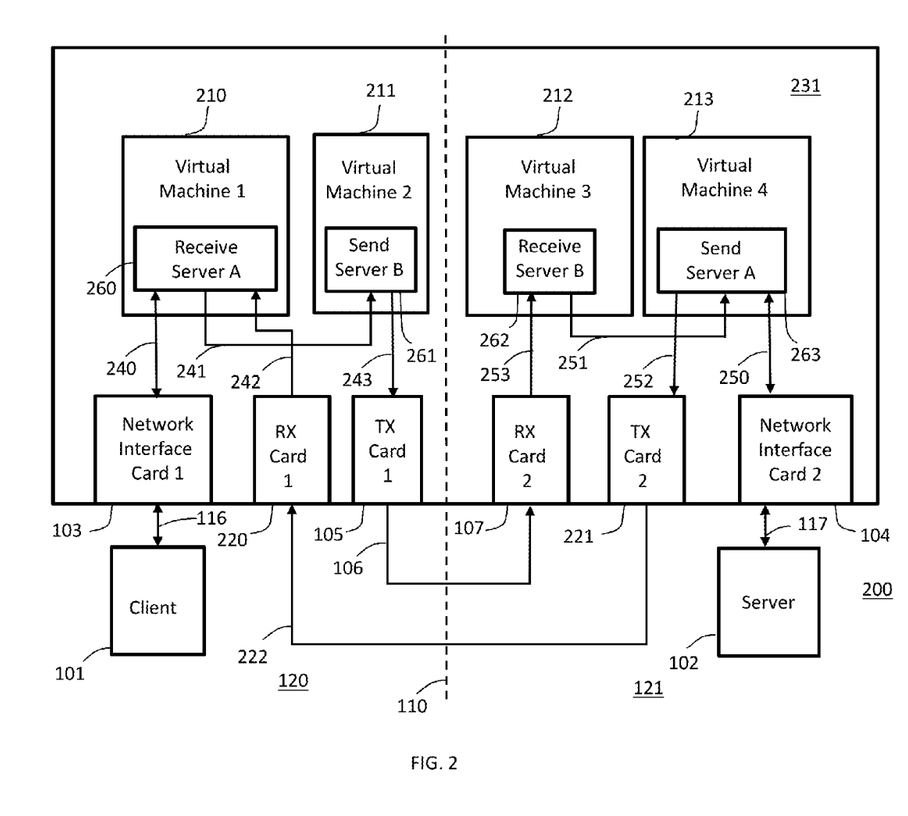
FIG. 2 is a block diagram of a two-way CDS system incorporating aspects of a first embodiment of the present disclosure.

Referring now to FIG. 2, a first embodiment of a two-way CDS system 200 is shown which, like the FIG. 1 embodiment, is based upon a single server computer 231. Two-way CDS system 200 provides the ability, for example, to provide Network File System (NFS) across security boundary 110, with a request for a file originating in client 101 (in a first security domain 120) that is forwarded to server 102 (in a second security domain 121 and configured to act as an NFS server) via a first one-way link (as discussed below and as explained in more detail in the '227 patent). In response to the file request, server 102 transfers the requested file (or other requested information) back to client 101 via a second separate one-way link (as discussed below and explained in more detail in the '227 patent). By employing separate virtual machines, CDS system 200 is able to provide the same functionality as provided by the CDS system disclosed in FIG. 3 of the '227 patent, while using only a single server computer instead of the four server computers used in the '227 patent system.

In the two-way CDS system 200, server computer 231 includes an additional set of matched TX and RX cards 221, 220 coupled by an external link 222. As with the FIG. 1 embodiment, TX card 221 and RX card 220 may be matched Owl DualDiode® communication cards provided by Owl Computing Technologies, Inc., with the TX card 221 coupled to the RX card 220 by an optical fiber 222.

Two-way CDS system 200 is configured with four separate servers 260, 261, 262 and 263 which are coupled in the same manner as servers 320, 330, 340 and 350 in the two-way CDS system 300 shown in FIG. 3 of the '227 patent. In particular, receive server A 260 and send server A 263 form a first one-way link for passing information from security domain 121 to security domain 120 while send server B 261 and receive server B 262 form a second one-way link for passing information from security domain 120 to security domain 121. Receive server A 260 is coupled to first network interface card 103 via link 240 and to the second RX card 220 via link 242, while send server A 263 is coupled to second network interface card 104 via link 250 and to second TX card 221 via link 252. Since TX card 221 is coupled to RX card 220 via link 222, a first one-way link is thus formed from security domain 121 to security domain 120. Similarly, send server B 261 is coupled to first network interface card 103 via link 241, receive server A 260 and link 240 and to first TX card 105 via link 243, while receive server B 262 is coupled to second network interface card 104 via link 251, send server A 263 and link 250 and to first RX card 107 vial link 253. Since TX card 105 is coupled to RX card 107 via external link 106, a second one-way link is thus formed from security domain 120 to security domain 121. This configuration is the same as in FIG. 3 of the '227 patent, and each of the four separate servers 260, 261, 262 and 263 operate nearly identically as to the corresponding servers in FIG. 3 of the '227 patent. The only difference is that link 241 is coupled to virtual network interface cards at virtual machines 210, 211 and link 251 is coupled to virtual network interface cards at virtual machine 212, 213. However, each of the servers 260, 261, 262 and 263 is implemented using separate respective virtual machines 210, 211, 212 and 213, respectively, running on a single computer 231, in the same manner as in the FIG. 1 embodiment. Thus, by using virtual machines, two-way CDS system 200 is able to provide the same functionality as the '227 patent system using a single computer, instead of requiring the four separate computers used in the '227 patent system.

In the embodiments shown in FIGS. 1 and 2, physical hardware-based one-way links are provided via dedicated TX and RX card sets coupled by an optical fiber, such as the Owl DualDiode® card sets provided by Owl Computing Technologies, Inc. In some circumstances satisfactory operation may be provided by implementing the functionality of the one-way link into a software-based one-way link that either runs on a separate virtual machine (FIGS. 3 and 4) or as part of the underlying software which manages the virtual machines (i.e., the hypervisor or virtual machine manager) (FIGS. 5 and 6).

Figure 3:
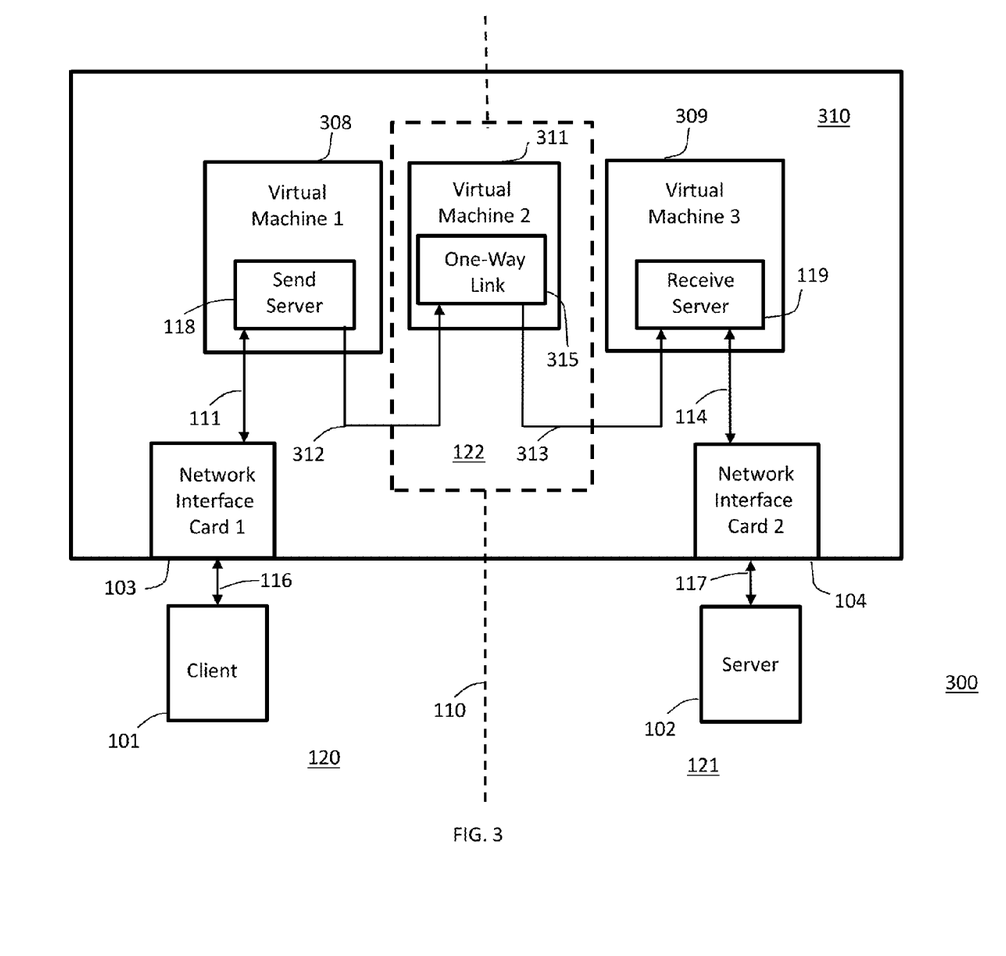
FIG. 3 is a block diagram of a one-way CDS system incorporating aspects of a second embodiment of the present disclosure.

For example, as shown in FIG. 3, a one-way CDS system 300 based on a virtual machine-based one-way link includes a send server 118 running on a virtual machine 308 of computer server 310. Virtual machine 308 is entirely within the first security domain 120. Send server 118 is coupled via a link 312 to the input of a virtual machine-based one-way link 315 that runs on virtual machine 311 of computer server 310. Virtual machine 311 is entirely within a third and separate security domain 122 that is between the first security domain 120 and the second security domain 121. In turn, an output of the virtual machine-based one-way link 315 is coupled via link 313 to receive server 119 running on virtual machine 309. Virtual machine 309 is entirely within the second security domain 121. By providing a third security domain 122 within computer server 310, system 300 ensures that no resources can be shared between virtual machine 311 and virtual machines 308, 309 and thus ensuring that data may only pass from send server 118 to receive server 119 (and that no data or signals of any kind can pass from receive server 119 to send server 118) as in the FIG. 1 embodiment. System 300 provides additional cost-savings by eliminating the need for a dedicated TX and RX card set (and for a related optical link coupling the TX card to the RX card). In addition, system 300 provides better reliability given that there is less dependence on hardware which could fail over time. System 300 operates identically to system 100 in FIG. 1 and the virtual machine-based one-way link 315 operates identically to the hardware-based one-way link in FIG. 1 that includes TX card 105, link 106 and RX card 107. In particular, information may be provided from send server 118 to receive server 119 via one-way link 315, but one-way link 315 prevents any information or signals of any kind from passing from receive server 119 to send server 118. As a result, by adding a virtual machine-based one-way link, system 300 provides the same level of security as system 100 in FIG. 1, but without the need for any one-way link hardware installed in server 310.

Figure 4:
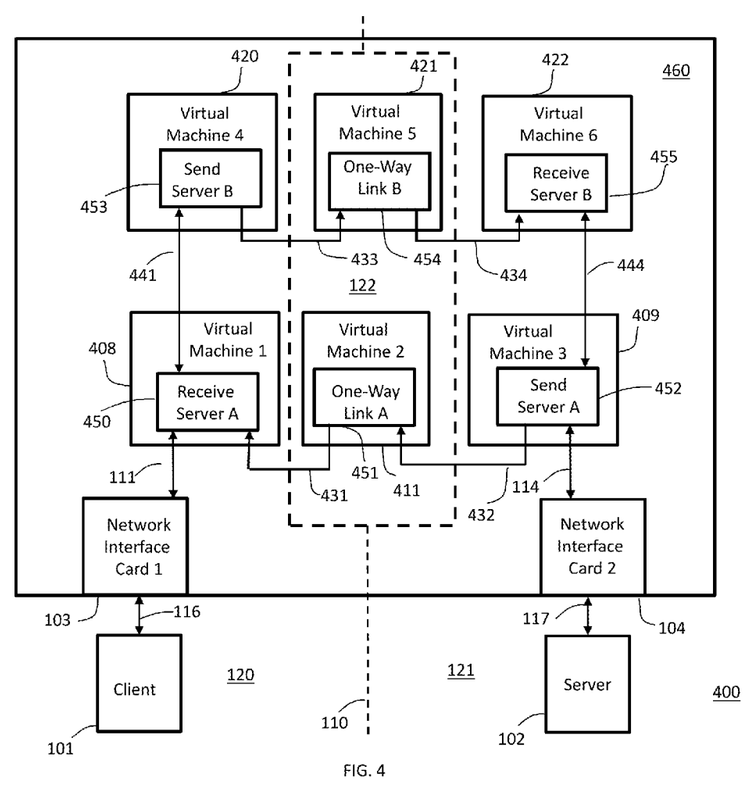
FIG. 4 is a block diagram of a two-way CDS system incorporating aspects of a second embodiment of the present disclosure.

Referring now to FIG. 4, a two-way CDS system 400 includes single computer server 460 and is based on virtual machine-based one-way links. CDS system 400 includes a send server A 452 running on a virtual machine 409 of computer server 460. Send server A 452 is coupled via a link 432 to an input of a first virtual machine-based one-way link (one-way link A) 451 running on a virtual machine 411. In turn, an output of the virtual machine-based one-way link 451 is coupled via link 431 to receive server A 450 running on virtual machine 408. In addition, send server B 453 on virtual machine 420 is coupled via a link 433 to an input of a second virtual machine-based one-way link (one-way link B) 454 running on a virtual machine 421. In turn, an output of the virtual machine-based one-way link 454 is coupled via link 434 to receive server B 455 running on virtual machine 422. Send server B 453 is coupled to the first network interface card 103 via a link 441, receive server A 450 and link 111. Receive server B is coupled to second network interface card 104 via link 444, send server A 452 and link 114. For the same reasons discussed above with respect to the FIG. 3 embodiment, the virtual machines 408, 411, 409, 420, 421, 422 are segregated into three separate security domains, with virtual machines 408, 420 within the first security domain 120, virtual machines 409, 422 within the second security domain 101 and virtual machines 411, 421 in the third security domain 122. The third security domain 122 is preferably subdivided into two portions, a first portion for virtual machine 411 and a second portion for virtual machine 421, to ensure that no cross-talk may occur between the first virtual machine-based one-way link 451 and the second virtual machine-based one-way link 454. System 400 provides additional cost-savings by eliminating the need for two dedicated TX and RX card sets (and for a related optical link coupling each TX card to the corresponding RX card). In addition, as with system 300 in FIG. 3, system 400 provides better reliability given that there is less dependence on hardware which could fail over time. System 400 operates identically to system 200 in FIG. 2 and the virtual machine-based one-way links 451, 454 operates identically to the corresponding hardware-based one-way links in FIG. 2. In particular, each one-way link 451, 454 allows information to be provided from the respective input to the output while preventing any information or signals of any kind from passing from the respective output to the respective input. As a result, by adding virtual machine-based one-way links, system 400 provides the same level of security as system 200 in FIG. 2, but without the need for any one-way link hardware installed in server 460.

Figure 5:
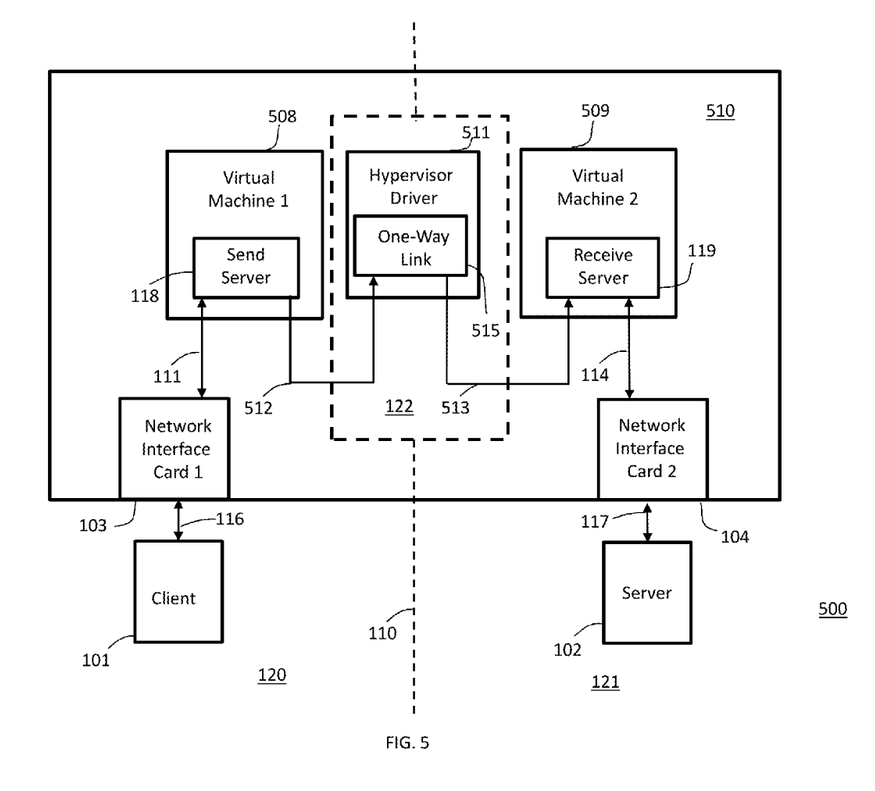
FIG. 5 is a block diagram of a one-way CDS system incorporating aspects of a third embodiment of the present disclosure.
Figure 6:
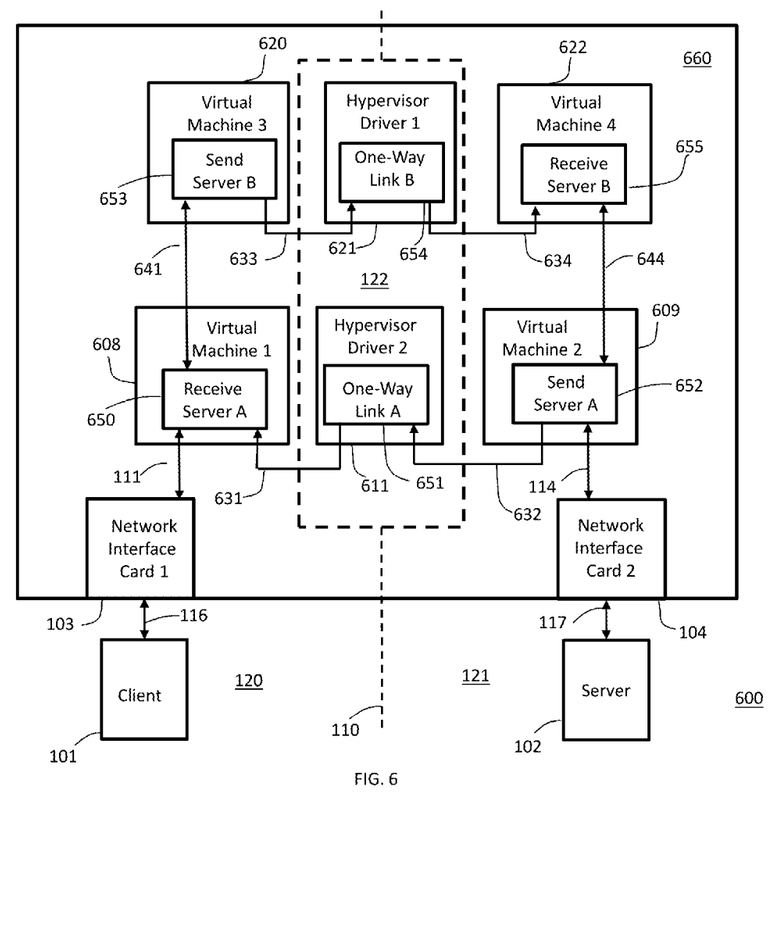
FIG. 6 is a block diagram of a two-way CDS system incorporating aspects of a third embodiment of the present disclosure.

FIG. 5 shows a one-way CDS system 500 which includes a hypervisor-based one-way link 515. System 500 includes a send server 118 running on a virtual machine 508. Send server 118 is coupled via a link 512 to the input of hypervisor-based one-way link 515. As one of ordinary skill in the art will readily recognize, the hypervisor level of software running on computer server 510 manages the operation of each of the virtual machines 508, 509. In turn, an output of the hypervisor-based one-way link 515 is coupled via link 513 to receive server 119 running on virtual machine 509. In this embodiment, the hypervisor-based one-way link 515 is within the third security domain 122 because a hypervisor driver does not, by definition, share resources with the virtual machines 508, 509. As with system 300, system 500 provides additional cost-savings by eliminating the need for a dedicated TX and RX card set (and for a related optical link coupling the TX card to the RX card). In addition, system 500 also provides better reliability given that there is less dependence on hardware which could fail over time and operates identically to system 100 in FIG. 1. The hypervisor-based one-way link 515 operates identically to the hardware-based one-way link in FIG. 1 that includes TX card 105, link 106 and RX card 107. In particular, information may be provided from send server 118 to receive server 119 via one-way link 515, but one-way link 515 prevents any information or signals of any kind from passing from receive server 119 to send server 118. As a result, by adding a hypervisor-based one-way link, system 500 provides the same level of security as system 100 in FIG. 1, but without the need for any one-way link hardware installed in server 510.

Referring now to FIG. 6, a two-way CDS system 600 based on hypervisor-based one-way links include a send server A 652 running on a virtual machine 609. Send server A 652 is coupled via a link 632 to an input of a first hypervisor-based one-way link (one-way link A) 651. In turn, an output of the hypervisor-based one-way link 651 is coupled via link 631 to receive server A 650 running on virtual machine 608. In addition, send server B 653 on virtual machine 620 is coupled via a link 633 to an input of a second hypervisor-based one-way link (one-way link B) 654. In turn, an output of the hypervisor-based one-way link 654 is coupled via link 634 to receive server B 655 running on virtual machine 622. Send server B 653 is coupled to the first network interface card 103 via a link 641, receive server A 650 and link 111. Receive server B is coupled to second network interface card 104 via link 644, send server A 652 and link 114. As with the FIG. 5 system, in this embodiment, the hypervisor-based one-way links 651, 654 are within the third security domain 122 because a hypervisor driver does not, by definition, share resources with the virtual machines 608, 609, 620, 622. As one of skill in the art will readily recognize, adequate precautions must be take to ensure that no cross-talk may occur between hypervisor-based one-way link 651 and hypervisor-based one-way link 654. System

600, like system 400, provides additional cost-savings by eliminating the need for two dedicated TX and RX card sets (and for a related optical link coupling each TX card to the corresponding RX card) and provides better reliability given that there is less dependence on hardware which could fail over time. System 600 operates identically to system 200 in FIG. 2 and the hypervisor-based one-way links 651, 654 operates identically to the corresponding hardware-based one-way links in FIG. 2. In particular, each one-way link 651, 654 allows information to be provided from the respective input to the output while preventing any information or signals of any kind from passing from the respective output to the respective input. As a result, by adding virtual machine-based one-way links, system 600 provides the same level of security as system 200 in FIG. 2, but without the need for any one-way link hardware installed in server 660.

The systems described with respect to FIGS. 1 to 4 herein each include only a single computer server, but maintain the identical operation as the prior systems disclosed in the '581 patent and the '227 patent which include either two computer servers ('581 patent) or four computer servers ('227 patent). In particular, as with the prior systems, a protocol break is provided across each one-way link in the systems described herein to ensure that there is no possibility of software attack via such link.

Although the present invention has been particularly shown and described with reference to the preferred embodiments and various aspects thereof, it will be appreciated by those of ordinary skill in the art that various changes and modifications may be made without departing from the spirit and scope of the invention.

What is claimed is:

1. A one-way cross-domain system for transferring information from a client in a first security domain to a server in a second separate security domain, comprising:
   a server computer configured to run a first virtual machine and a second virtual machine, the first virtual machine completely separate from the second virtual machine;
   a first network interface card installed in the server computer for coupling to the client in the first security domain;
   a second network interface card installed in the server computer for coupling to the server in the second separate security domain;
   a one-way transmit card installed in the server computer, the one-way transmit card having an external output; a one-way receive card installed in the server computer, the one-way receive card having an external input; an external communications link having a first end coupled only to the external output of the one-way transmit card and a second end coupled only to the external input of the one-way receive card;
   wherein the one-way transmit card is configured to only communicate with the one-way receive card via the external communications link;
   wherein the first virtual machine is configured to only communicate with the first network interface card and the one-way transmit card, the first virtual machine configured to receive information from the client via the first network interface card and to forward the received information to the one-way transmit card;
   wherein the second virtual machine is configured to only communicate with the one-way receive card and the second network interface card, the second virtual machine configured to receive the information forwarded from the first virtual machine via the one-way transmit card, the external communications link, and the one-way receive card and to forward the received information to the server in the second separate security domain via the second network interface card;
   wherein the client is only communicatively coupled to the server via the first network interface card, the first virtual machine, the transmit card, the external communications link, the receive card, the second virtual machine and the second network interface card; and
   wherein the server is not otherwise communicatively coupled to the client.

2. The one-way cross-domain system of claim 1, wherein the server computer includes a memory separable into at least a first portion and a second portion, the first portion of the memory separate from the second portion of the memory, wherein the first network interface card, the first virtual machine and the one-way transfer card are each configured to access only the first portion of the memory, and wherein the one-way receive card, the second virtual machine and the second network interface card are each configured to access only the second portion of the memory.

3. The one-way cross-domain system of claim 1, wherein the external communications link is an optical fiber.

4. A one-way cross-domain system for transferring information from a client in a first security domain to a server in a second separate security domain, comprising:
   a server computer configured to run a first virtual machine, a second virtual machine, and a third virtual machine, each of the virtual machines completely separate from each other virtual machine;
   a first network interface card installed in the server computer for coupling to the client in the first security domain;
   a second network interface card installed in the server computer for coupling to the server in the second separate security domain;
   wherein the first virtual machine is configured to only communicate with the first network interface card and the second virtual machine, the first virtual machine configured to receive information from the client via the first network interface card and to forward the received information to the second virtual machine;
   wherein the second virtual machine is configured to only communicate with the first virtual machine and the third virtual machine, the second virtual machine configured to receive information from the first virtual machine and to forward the received information to the third virtual machine, the second virtual machine configured to be unable to receive any information from the third virtual machine and to be unable to send any information to the first virtual machine;
   wherein the third virtual machine is configured to only communicate with the second virtual machine and the second network interface card, the third virtual machine configured to receive the information forwarded from the first virtual machine via the second virtual machine and to forward the received information to the server in the second separate security domain via the second network interface card;
   wherein the client is only communicatively coupled to the server via the first network interface card, the first virtual machine, the second virtual machine, the third virtual machine and the second network interface card; and
   wherein the server is not otherwise communicatively coupled to the client.

5. The one-way cross-domain system of claim 4, wherein the third virtual machine is within a third separate security domain.

6. The one-way cross-domain system of claim 4, wherein the server computer includes a memory separable into at least a first portion, a second portion and a third portion, each portion of the memory separate from each other portion of the memory, wherein first network interface card and the first virtual machine are each configured to access only the first portion of the memory, wherein the second virtual machine is configured to access only the second portion of the memory, and wherein the third virtual machine and the second network interface card are each configured to access only the third portion of the memory.

7. A one-way cross-domain system for transferring information from a client in a first security domain to a server in a second separate security domain, comprising:
  a server computer configured to run a first virtual machine and a second virtual machine, the first virtual machine completely separate from the second virtual machine, the first virtual machine and the second virtual machine controlled by a hypervisor, the server computer also configured to provide a hypervisor-based one-way link having an input and an output, the hypervisor-based one-way link configured to transfer information received at the input to the output and to be incapable of transferring any information from the output to the input;
  a first network interface card installed in the server computer for coupling to the client in the first security domain;
  a second network interface card installed in the server computer for coupling to the server in the second separate security domain;
  wherein the first virtual machine is configured to only communicate with the first network interface card and the input of the hypervisor-based one-way link, the first virtual machine configured to receive information from the client via the first network interface card and to forward the received information to the input of the hypervisor-based one-way link;
  wherein the second virtual machine is configured to only communicate with the output of the hypervisor-based one-way link and the second network interface card, the second virtual machine configured to receive the information forwarded from the first virtual machine via the hypervisor-based one-way link and to forward the received information to the server in the second separate security domain via the second network interface card;
  wherein the client is only communicatively coupled to the server via the first network interface card, the first virtual machine, the hypervisor-based one-way link, the second virtual machine and the second network interface card; and
  wherein the server is not otherwise communicatively coupled to the client.

8. The one-way cross-domain system of claim 7, wherein the hypervisor-based one-way link is within a third separate security domain.

9. The one-way cross-domain system of claim 7, wherein the server computer includes a memory separable into at least a first portion, a second portion and a third portion, each portion of the memory separate from each other portion of the memory, wherein first network interface card and the first virtual machine are each configured to access only the first portion of the memory, wherein the hypervisor-based one-way link is configured to access only the second portion of the memory, and wherein the second virtual machine and the second network interface card are each configured to access only the third portion of the memory.

10. A bilateral cross-domain system for transferring first information from a client in a first security domain to a server in a second separate security domain and second information from the server in the second separate security domain to the client in the first security domain, comprising:
  a server computer configured to run a first virtual machine, a second virtual machine, a third virtual machine and a fourth virtual machine, each of the virtual machines completely separate from each of the other virtual machines;
  a first network interface card installed in the server computer for coupling to the client in the first security domain;
  a second network interface card installed in the server computer for coupling to the server in the second separate security domain;
  a first one-way transmit card installed in the server computer, the first one-way transmit card having an external output;
  a first one-way receive card installed in the server computer, the first one-way receive card having an external input;
  a first external communications link having a first end coupled only to the external output of the first one-way transmit card and a second end coupled only to the external input of the first one-way receive card;
  a second one-way transmit card installed in the server computer, the second one-way transmit card having an external output;
  a second one-way receive card installed in the server computer, the second one-way receive card having an external input;
  a second external communications link having a first end coupled only to the external output of the second one-way transmit card and a second end coupled only to the external input of the second one-way receive card;
  wherein the first one-way transmit card is configured to only communicate with the first one-way receive card via the first external communications link;
  wherein the second one-way transmit card is configured to only communicate with the second one-way receive card via the second external communications link;
  wherein the first virtual machine is configured to only communicate with the first network interface card, the second one-way receive card and the second virtual machine, the first virtual machine configured to receive the first information from the client via the first network interface card and to forward the received first information to the second virtual machine, the first virtual machine configured to receive the second information from the second one-way receive card via the second external communications link and the second one-way transmit card and to forward the received second information to the client via the first network interface card;
  wherein the second virtual machine is configured to only communicate with the first virtual machine and the first one-way transmit card, the second virtual machine configured to receive the first information forwarded from the first virtual machine and to forward the received first information to the first one-way transmit card;

wherein the third virtual machine is configured to only communicate with the first one-way receive card and the fourth virtual machine, the third virtual machine configured to receive the first information from the first one-way receive card via the first external communications link and the first one-way transmit card and to forward the received first information to the fourth virtual machine; and wherein the fourth virtual machine is configured to only communicate with the third virtual machine, the second one-way transmit card and the second network interface card, the fourth virtual machine configured to receive the first information forwarded from the third virtual machine and to forward the received first information to the server in the second separate security domain via the second network interface card, the fourth virtual machine configured to receive the second information from the server in the second separate security domain via the second network interface card and to forward the received second information to the second one-way transmit card.

11. The bilateral cross-domain system of claim 10, wherein the server computer includes a memory separable into at least four separate portions, each portion of the memory separate from each other portion of the memory, wherein the first network interface card, the first virtual machine and the second one-way receive card are each configured to access only a first portion of the memory, wherein the second virtual machine and the first one-way transfer card are each configured to access only a second portion of the memory, wherein the first one-way receive card and the third virtual machine are each configured to access only a third portion of the memory, and wherein the second one-way transfer card, the fourth virtual machine and the second network interface card are each configured to access only a fourth portion of the memory.

12. The one-way cross-domain system of claim 10, wherein the first and second external communications links are each a separate optical fiber.

13. A bilateral cross-domain system for transferring first information from a client in a first security domain to a server in a second separate security domain and second information from the server in the second separate security domain to the client in the first security domain, comprising:
    a server computer configured to run a first virtual machine, a second virtual machine, a third virtual machine, a fourth virtual machine, a fifth virtual machine and a sixth virtual machine, each of the virtual machines completely separate from each of the other virtual machines;
    a first network interface card installed in the server computer for coupling to the client in the first security domain;
    a second network interface card installed in the server computer for coupling to the server in the second separate security domain;
    wherein the first virtual machine is configured to only communicate with the first network interface card, the second virtual machine and the fourth virtual machine, the first virtual machine configured to receive the first information from the client via the first network interface card and to forward the received first information to the fourth virtual machine, the first virtual machine configured to receive the second information from the second virtual machine and to forward the received second information to the client in the first security domain via the first network interface card;

wherein the second virtual machine is configured to only communicate with the first virtual machine and the third virtual machine, the second virtual machine configured to receive the second information from the third virtual machine and to forward the received second information to the first virtual machine, the second virtual machine configured to be unable to receive any information from the first virtual machine and to be unable to send any information to the third virtual machine;

wherein the third virtual machine is configured to only communicate with the second virtual machine, the second network interface card and the sixth virtual machine, the third virtual machine configured to receive the first information forwarded from the first virtual machine via the fourth virtual machine, the fifth virtual machine and the sixth virtual machine and to forward the received first information to the server in the second separate security domain via the second network interface card, the third virtual machine configured to receive the second information from the server in the second separate security domain via the second network interface card and to forward the received second information to the second virtual machine;

wherein the fourth virtual machine is configured to only communicate with the first virtual machine and the fifth virtual machine, the fourth virtual machine configured to receive the first information forwarded from the first virtual machine and to forward the received first information to the fifth virtual machine;

wherein the fifth virtual machine is configured to only communicate with the fourth virtual machine and the sixth virtual machine, the fifth virtual machine configured to receive the first information from the first virtual machine and to forward the received first information to the sixth virtual machine, the fifth virtual machine configured to be unable to receive any information from the sixth virtual machine and to be unable to send any information to the fourth virtual machine; and wherein the sixth virtual machine is configured to only communicate with the fifth virtual machine and the third virtual machine, the sixth virtual machine configured to receive the first information from the fifth virtual machine and to forward the received first information to the third virtual machine.

14. The bilateral cross-domain system of claim 13, wherein the second virtual machine and the fifth virtual machine are each within a third separate security domain.

15. The bilateral cross-domain system of claim 14, wherein the third separate security domain is subdivided into two separate portions, with the second virtual machine within one of the two separate portions and the fifth virtual machine within the other of the two separate portions.

16. The bilateral cross-domain system of claim 13, wherein the server computer includes a memory separable into at least six portions, each portion of the memory separate from each other portion of the memory, wherein the first network interface card and the first virtual machine are each configured to access only a first portion of the memory, wherein the second virtual machine is configured to access only a second portion of the memory, wherein the third virtual machine and the second network interface card are each configured to access only the third portion of the memory, wherein the fourth virtual machine is configured to access only a fourth portion of the memory, wherein the fifth virtual machine is configured to access only a fifth portion of the memory, wherein the sixth virtual machine is configured to access only a sixth portion of the memory.

17. A bilateral cross-domain system for transferring first information from a client in a first security domain to a server in a second separate security domain and second information from the server in the second separate security domain to the client in the first security domain, comprising:

a server computer configured to run four virtual machines, each of the virtual machines completely separate from each other virtual machine, each of the virtual machines controlled by a hypervisor, the server computer also configured to provide a first hypervisor-based one-way link having an input and an output and a second hypervisor-based one-way link having an input and an output, each of the hypervisor-based one-way links configured to transfer information received at the input to the output and to be incapable of transferring any information from the output to the input;

a first network interface card installed in the server computer for coupling to the client in the first security domain;

a second network interface card installed in the server computer for coupling to the server in the second separate security domain;

wherein the first virtual machine is configured to only communicate with the first network interface card, the third virtual machine and the output of the first hypervisor-based one-way link, the first virtual machine configured to receive the first information from the client via the first network interface card and to forward the received first information to the third virtual machine, the first virtual machine configured to receive the second information from the output of the first hypervisor-based one-way link and to forward the received second information to the client via the first network interface card;

wherein the second virtual machine is configured to only communicate with the input of the first hypervisor-based one-way link, the fourth virtual machine and the second network interface card, the second virtual machine configured to receive the first information forwarded from the first virtual machine via the fourth virtual machine, the second hypervisor-based one-way link and the third virtual machine and to forward the received first information to the server in the second separate security domain via the second network interface card, the second virtual machine configured to receive the second information from the server via the second one-way network interface card and to forward the received second information to the input of the first hypervisor-based one-way link;

wherein the third virtual machine is configured to only communicate with the first virtual machine and the input of the second hypervisor-based one-way link, the third virtual machine configured to receive the first information from the first virtual machine and to forward the received first information to the input of the second hypervisor-based one-way link; and wherein the fourth virtual machine is configured to only communicate with the output of the second hypervisor-based one-way link and the second virtual machine, the fourth virtual machine configured to receive the first information from the output of the second hypervisor-based one-way link and to forward the received first information to the second virtual machine.

18. The bilateral cross-domain system of claim 17, wherein each of the first and second hypervisor-based one-way links are within a third separate security domain.

19. The bilateral cross-domain system of claim 17, wherein the server computer includes a memory separable into at least six portions, each portion of the memory separate from each other portion of the memory, wherein the first network interface card and the first virtual machine are each configured to access only a first portion of the memory, wherein the first hypervisor-based one-way link is configured to access only a second portion of the memory, wherein the second virtual machine and the second network interface card are each configured to access only a third portion of the memory, wherein the third network interface card is configured to access only a fourth portion of the memory, wherein the second hypervisor-based one-way link is configured to access only a fifth portion of the memory, wherein the fourth virtual machine is configured to access only a sixth portion of the memory.

\* \* \* \* \*